US006533997B1

United States Patent
Bergman

(10) Patent No.: US 6,533,997 B1
(45) Date of Patent: Mar. 18, 2003

(54) METHOD AND DEVICE FOR HOT ISOSTATIC PRESSING

(75) Inventor: Carl Bergman, Västerås (SE)

(73) Assignee: Flow Holding GmbH (SAGL) Limited Liability Company (CH)

(*) Notice: Subject to any disclaimer, the term of this patent is extended or adjusted under 35 U.S.C. 154(b) by 0 days.

(21) Appl. No.: 09/787,219

(22) PCT Filed: Sep. 16, 1999

(86) PCT No.: PCT/SE99/01615

§ 371 (c)(1),
(2), (4) Date: May 31, 2001

(87) PCT Pub. No.: WO00/15371

PCT Pub. Date: Mar. 23, 2000

(30) Foreign Application Priority Data

Sep. 17, 1998 (SE) .............................................. 9803191

(51) Int. Cl.[7] .................................................. B22F 3/12
(52) U.S. Cl. ........................................... 419/49; 425/78
(58) Field of Search ........................ 419/49, 48; 425/78

(56) References Cited

U.S. PATENT DOCUMENTS 4,217,087 A  8/1980 Bowles ........................ 425/78
5,123,832 A  6/1992 Bergman et al. ......... 425/405.2
5,251,880 A  10/1993 Ishii et al. ..................... 266/44

FOREIGN PATENT DOCUMENTS

WO  WO 97/20652  6/1997

Primary Examiner—Daniel J. Jenkins
(74) Attorney, Agent, or Firm—Seed Intellectual Property Law Group PLLC

(57) ABSTRACT

An isostatic press for hot isostatic pressing having a pressure vessel (1) in which a furnace chamber (2) is arranged with a space (3) between the furnace chamber (2) and the walls of the pressure vessel (2). The furnace chamber (2) has a heat-insulating mantle and heat-insulating top wall and bottom wall, and passageways (5, 6) are arranged in the walls of the furnace chamber (2). A gas outlet means is arranged in the interior of the furnace chamber (2). Gas is removed directly from the furnace chamber (2) by the gas outlet means. Advantages include that treated articles (11) are cooled rapidly, as cooling takes place during the same time as decompression. Articles (11) may also be rapidly cooled to a temperature at which they are easily handled.

11 Claims, 1 Drawing Sheet

METHOD AND DEVICE FOR HOT ISOSTATIC PRESSING

TECHNICAL FIELD

The invention relates to a press for hot isostatic pressing. The press is provided with means for rapidly cooling treated articles after pressing by removing pressurised gas from the furnace chamber.

BACKGROUND ART

Presses for hot isostatic pressing are known for a variety of end uses including compaction of articles made from powders, consolidation of castings and for gas bonding of articles. Such a Hot Isostatic Press (HIP) press usually operates within a wide rgange of temperatures and pressures, between 400 and 2000° C. and between 300 and 2000 bar. A pressure medium such as argon gas is commonly used, but other fluids including liquids may also be used.

A HIP substantially consists of a pressure vessel in which a furnace is arranged. Such a furnace is usually adapted to be heated by means of electric heating elements arranged around the exterior walls of the furnace. Heating elements may alternatively be mounted in the bottom of the furnace. The electric heating elements are usually surrounded by a heat insulating mantle. The top and bottom of the furnace are each furnished with a heat insulating layer, forming a furnace chamber with heat insulated walls. Between the heat insulated furnace chamber and the pressure vessel wall is a space containing pressure medium. The pressure medium in the space surrounding the furnace chamber is usually cooler than the temperature of the pressure medium in the furnace chamber as the walls of the pressure vessel are generally cooled by the surroundings, if not by a cooling system arranged for that purpose.

For many applications it is desirable to cool the furnace chamber rapidly in order to obtain certain material properties. It is also generally desirable to remove treated articles as quickly as possible to obtain short production cycle times. In consequence it is also difficult to cool articles down to a temperature at which they may be conveniently handled and still achieve a short production cycle time.

It is known from U.S. Pat. No. 4,217,087 to promote cooling in a furnace chamber of a HIP by circulating amounts of a cooler inert gas from a space surrounding the furnace chamber inside the furnace chamber. This method gives a reduced cooling time but includes the use of a valve with moving parts incorporated in the walls of the pressure vessel. It is difficult and expensive to construct and maintain valves with moving parts inside the pressure vessel of a HIP because of severe stress from high pressure combined with high temperature.

In U.S. Pat. No. 5,251,880 a cooling system for a HIP is disclosed that comprises openings in the walls between a furnace chamber and a surrounding pressure vessel and associated opening and closing mechanisms. Openings in the top of the furnace chamber are disclosed. The circulation of gas surrounding the furnace chamber into the furnace chamber is facilitated under cooling. This device also incorporates a valve with moving parts which, similar to U.S. Pat. No. 4,217,087, is difficult and expensive to construct and maintain because of severe stress from high pressure combined with high temperature.

It is known from U.S. Pat. No. 5,123,832 to cool the furnace chamber of a HIP rapidly by the circulation of a cooler pressure medium through a furnace chamber. In this device for and method of cooling articles, one or more pumps or fans are arranged in the bottom of the pressure vessel and at the bottom of the furnace chamber. Cooling time is reduced by circulating proportions of a cooler gas from spaces between the walls of the furnace chamber and the walls of the pressure vessel into the furnace chamber by means of the pumps or fans. However a shortcoming of this apparatus is that a cooling stage takes place first, followed by a decompression stage, contributing to a somewhat lengthy production cycle time. It is also rather lengthy to cool articles to a sufficiently low temperature such that they are relatively easy to handle manually.

SUMMARY OF THE INVENTION

It is an object of the invention to provide a hot isostatic press. It is another object of the invention to provide a method to cool the treated articles in a hot isostatic press rapidly. It is a another object of the invention to rapidly cool treated articles such that they may be removed from the invention at a temperature at which they can be conveniently handled. It is a still further object to achieve improved control over the cooling rate of treated articles.

These and other objects are realised by a hot isostatic press according to the invention. The present invention is an isostatic press for hot isostatic pressing of articles, having a pressure vessel in which a furnace chamber is arranged with a space between the furnace chamber and the walls of the pressure vessel. The furnace chamber has a heat-insulating mantle and heat-insulating top wall and bottom wall, and one or more passageways are arranged in the walls of the furnace chamber. The present invention is characterised in that at least one gas outlet is arranged in the interior of the furnace chamber connected to means arranged outside the pressure vessel for receiving gas. When rapidly cooling treated articles, gas is removed from the interior of the furnace chamber by a gas outlet means such as a pipe.

The advantage of the present invention is that treated articles may be cooled rapidly. This gives a technical benefit of greater control over material properties and an economic benefit of shorter production cycle times. A shorter cycle time is produced by carrying out two stages, the cooling of the treated articles and the decompression of the gas at the same time. A further advantage is that the present invention is more efficient. First, treated articles inside the furnace chamber are cooled by a flow of cooler gas flowing in from the space surrounding the furnace chamber into the furnace chamber. Secondly, the greater part of the adiabatic cooling effect due to decompression of the gas is absorbed in the furnace chamber, further cooling the treated articles. A still further advantage is that isostaticly treated articles cooled rapidly in one application of the invention are cooled to around 250° C. such that the treated articles are conveniently handled using protective gloves. Rapidly cooling treated articles by removal of the gas from the interior of the furnace chamber also permits both the temperature in the furnace chamber to be measured more directly via the gas flow. The gas flow past the articles is also under more direct control than with conventional methods in which gas is circulated from and removed from spaces surrounding a furnace chamber that contain cooler gas. The invention also has the advantage that no moving parts, such as valves for example, are required in or close to the furnace chamber. This simplifies construction and reduces the cost of an isostatic press for HIP according to the invention which, together with the shorter cycle time, significantly reduces the cost of treating articles in a HIP process.

BRIEF DESCRIPTION OF THE DRAWINGS

The present invention will be described in more detail in connection with the enclosed drawings.

DESCRIPTION OF PREFERRED EMBODIMENT

Figure 1:
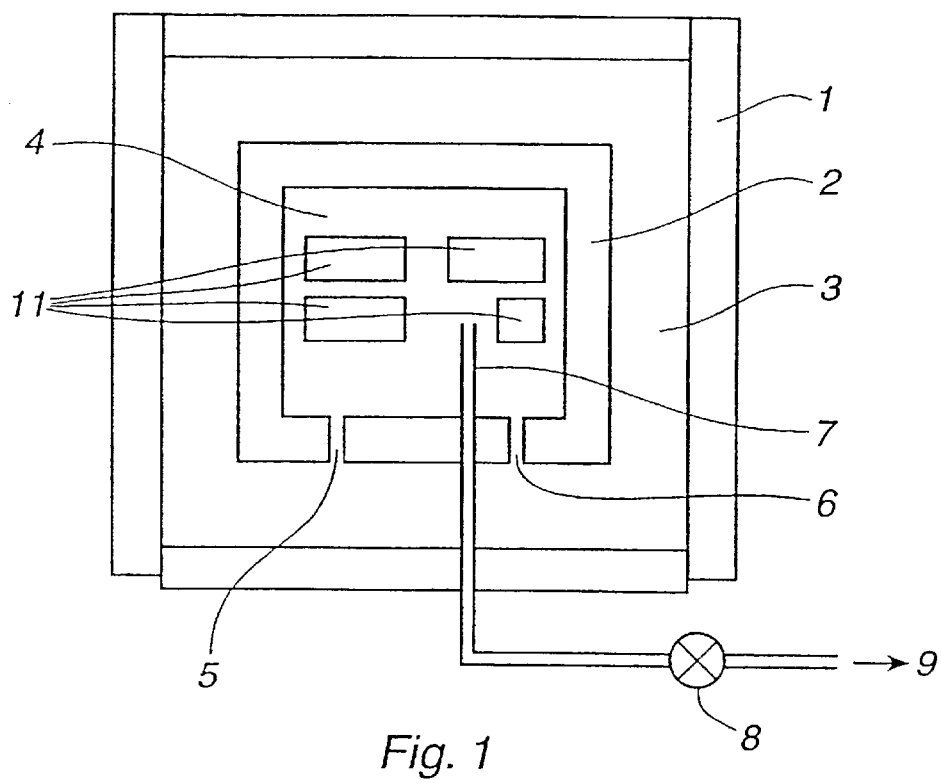
FIG. 1 shows schematically a hot isostatic press according to the invention.

FIG. 1 shows schematically a HIP according to the present invention. A pressure vessel 1 contains a furnace chamber 2 arranged with a space 3 between the walls of the furnace chamber 2 and the walls of the pressure vessel 1. The heat insulated walls of the furnace chamber 2 may comprise a heat insulated mantle. Articles 11 for treatment by hot isostatic pressing are arranged in the interior 4 of the furnace chamber 2. Passageways 5, 6 are arranged in the bottom wall of the furnace chamber 2. A outlet means for gas from the interior of the furnace chamber 2 according to the invention is shown in FIG. 1 arranged in the form of a pipe 7. The pipe 7 is connected via a control means such as valve 8 to a gas system 9 outside the pressure vessel 1.

Figure 2:
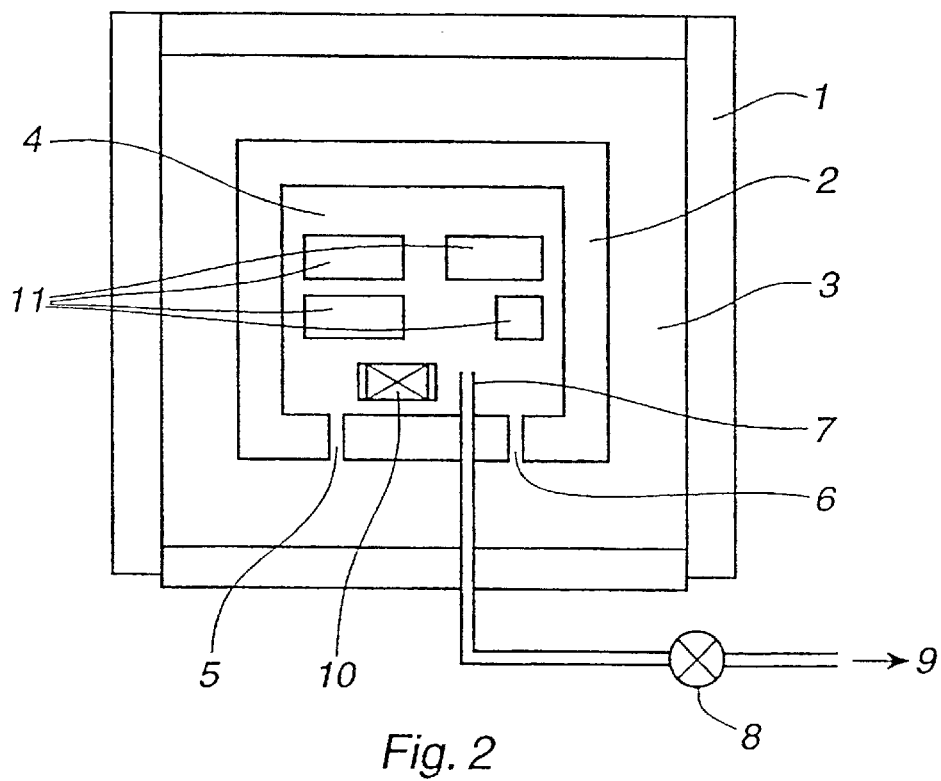
FIG. 2 shows schematically a development of a hot isostatic press according to the invention.

FIG. 2 shows a development of the invention. A forced circulation means 10 is shown positioned inside the furnace chamber 2.

Following a hot isostatic pressure treatment, articles 11 are cooled rapidly according to the invention by operating a control means such as by opening valve 8 to allow gas to exit directly from the interior of the furnace chamber 2. The hot gas from the interior of the furnace chamber 2 flows out of the furnace chamber 2 through gas outlet means such as the pipe 7. Cooler gas, from the space 3 between the walls of the furnace chamber 2 and the pressure vessel 1, flows into the furnace chamber through passageways such as 5, 6 thus cooling the treated articles 11 before subsequently exiting from the furnace chamber 2 through pipe 7. All of the gas present, that is, the hotter gas present in the furnace chamber 2 at the start of cooling, as well as the cooler gas in the space 3 between the furnace chamber 2 and the walls of the pressure vessel 1 that flows into the furnace chamber 2, subsequently expands as the pressure falls in the furnace chamber 2. In so doing, all of the gas present inside the HIP provides an adiabatic cooling effect to further cool the articles 11 in the furnace chamber 2. Both cooling and decompression take place at the same time with the result that the production cycle time is shorter.

FIG. 2 shows a development of the invention, in which a forced circulation means 10 such as a fan, stirrer or pump may be arranged in furnace chamber 2 to provide even temperature distribution. During rapid cooling of treated articles 11, the use of forced circulation means 10 may be combined with positioning the gas outlet means, shown in FIG. 2 as pipe 7, so that an entrance into the gas outlet means, which in this example shown is the opening at the end of the pipe 7, is positioned at a point lower in the interior of furnace chamber 2, that is to say, somewhat closer to the bottom walls of the furnace chamber 2 rather than substantially close to the center of the furnace chamber 2.

The invention is not limited to the embodiment described, but to a number of modifications within the reach of the person skilled in the art that are feasible within the scope of the claims. Thus, for example, in FIG. 1 the gas outlet means for removing gas from the inside of the furnace chamber is shown as a pipe 7. Other forms of ducting or channels may alternatively be arranged as a gas outlet means inside the furnace chamber 2 in place of a pipe such as pipe 7. A gas outlet means may be arranged in the interior of the furnace chamber 2 in such a position relative to an article or articles 11 as to provide a desired distribution of gas flow among articles 11 or around a single article as required. More than one gas outlet means may be arranged in the interior of the furnace chamber 2 to provide a desired distribution of gas flow during cooling. This includes a plurality of gas outlet means arranged to distribute the gas flow evenly among many articles 11. This also includes a plurality of gas outlet means placed to distribute gas flow around a single article, such as a large casting, to obtain a required cooling rate in different parts of a casting, or where, for example, changes in cross-sectional thickness require an adjustment in gas flow. One or more passageways may alternatively be arranged in the top wall of the furnace chamber 2 as well as, or instead of, being arranged in the bottom wall as shown by passageways 5, 6 in FIGS. 1 and 2.

In an application of the invention nitrogen gas is used as a pressure medium. Articles 11 made out of an aluminium based alloy are treated in a HIP process using pressures between 300 and 2000 bar and then rapidly cooled. Treated articles 11 are manually removed from the HIP after rapid cooling to a temperature of around 250° C. using protective gloves. In this process the articles 11 are subjected to temperatures in the range of about 500–520° C. and a gas outlet means in the form of a pipe made out of stainless steel is sufficient.

For HIP processes involving temperatures in excess of 500–550° C. nickel based alloys such as Iconel may be used. Other nickel based alloys, such as oxide dispersion strengthened (ODS) alloys for example PM1000 are also suitable for use at high temperatures. Alloys made from metals such as titanium with higher temperature resistant properties may be also used at—temperatures greatly in excess of 550° C. The present invention may be used for processes involving temperatures in the region of 1000° C. by constructing the gas outlet means using high performance temperature resistant metals and/or alloys presently available, and/or with a combination of ceramic parts and liners, and/or combined with a cooling system to cool a gas outlet means.

The present invention is equally applicable to the hot isostatic pressing of articles using other gases as a pressure medium, as well as liquids such as oils, salt solutions or hydraulic fluids.

What is claimed is:

1. An isostatic press for the treatment of articles by hot isostatic pressing comprising a pressure vessel in which a furnace chamber is arranged with a space between the furnace chamber and the walls of the pressure vessel, a perimeter of the furnace chamber being substantially defined by a heat-insulating mantle, including heat insulating top, side and bottom walls, with one or more passageways arranged in the heat-insulating mantle, and a pressure medium outlet means arranged in a wall of the pressure vessel, wherein at least one pressure medium outlet means is arranged extending into and from an interior of the furnace chamber to exterior of the pressure vessel, the pressure medium outlet means being selectively opened to a region having sufficiently low pressure to vent the pressure medium from the furnace chamber to the exterior of the pressure vessel, thereby reducing the pressure in the furnace chamber.

2. An isostatic press according to claim 1, wherein the pressure medium outlet means extends into the interior of said furnace chamber.

3. An isostatic press according to claim 1, further comprising forced circulation means arranged in the interior of the furnace chamber.

4. An isostatic press according to any one of the claims 1–3, wherein the pressure medium outlet means is connected to a control means for regulating the flow of pressure medium out of the furnace chamber.

5. An isostatic press according to claim 4, wherein the control means comprises a valve for regulating the flow of pressure medium out of said furnace chamber.

6. An isostatic press according to claim 1, wherein the position of the pressure medium outlet means inside the furnace chamber is suitably arranged to provide a flow of pressure medium around or among one or more different types and/or sizes of article.

7. An isostatic press according to claim 1, wherein more than one pressure medium outlet is arranged in the interior of the furnace chamber, positioned with respect to an article or alternatively positioned among articles to achieve a required flow of pressure medium.

8. Use of an isostatic press according to any of claims 1–3, 6 or 7 for the rapid cooling of isostaticly treated articles.

9. A method for removing a pressure medium contained in the interior of a furnace chamber, which furnace chamber is arranged in a pressure vessel of an isostatic press and is provided with at least one passageway extending to a space between the walls of the pressure vessel and the furnace chamber, in which furnace chamber is arranged at least one article, comprising:

removing the pressure medium directly from the interior of the furnace chamber to a low pressure region exterior of the pressure vessel via a pressure medium outlet means arranged in a wall of the pressure vessel and extending into the interior of the furnace chamber to simultaneously depressurize the furnace chamber and cool the treated article.

10. The method according to claim 9, wherein the rate at which pressure medium is removed from said furnace chamber through said pressure medium outlet means is variably controlled by control means.

11. An isostatic press according to claim 2, wherein the pressure medium outlet means comprises a pipe.

* * * * *

UNITED STATES PATENT AND TRADEMARK OFFICE
CERTIFICATE OF CORRECTION

PATENT NO. : 6,533,997 B1
DATED : March 18, 2003
INVENTOR(S) : Carl Bergman

It is certified that error appears in the above-identified patent and that said Letters Patent is hereby corrected as shown below:

<u>Title page,</u>
Item [73], the assignee name should read -- Flow Holdings GmbH (SAGL) Limited Liability Company --.
Item [57], ABSTRACT,
Line 4, "of the pressure vessel (2)" should read -- of the pressure vessel (1) --.

Signed and Sealed this

Twenty-third Day of December, 2003

JAMES E. ROGAN
*Director of the United States Patent and Trademark Office*